United States Patent

Calabro et al.

[11] Patent Number: 6,148,610
[45] Date of Patent: Nov. 21, 2000

[54] SOLID PROPELLANT CHARGE FOR A PROPULSION UNIT AND PROPULSION UNIT EQUIPPED WITH SUCH A CHARGE

[75] Inventors: Max Calabro, Villennes; Jean Thepenier, Saint-Medard en Jalles, both of France

[73] Assignees: Aerospatiale Societe Nationale Industrielle; Societe Nationale des Poudres et Explosifs, both of Paris, France

[21] Appl. No.: 09/099,067

[22] Filed: Jun. 16, 1998

[30] Foreign Application Priority Data

Jun. 16, 1997 [FR] France ................... 97 07418

[51] Int. Cl.$^7$ ........................ F02K 9/10
[52] U.S. Cl. ............. 60/250; 60/253; 102/287; 102/288
[58] Field of Search ............ 60/250, 253; 102/287, 102/288, 291

[56] References Cited

U.S. PATENT DOCUMENTS

| | | | |
|---|---|---|---|
| 2,114,214 | 4/1938 | Damblanc | 60/253 |
| 3,088,273 | 5/1963 | Adelman et al. | 60/253 |
| 3,407,736 | 10/1968 | Beuschel | 60/253 |
| 3,427,805 | 2/1969 | Osburn . | |
| 4,466,352 | 8/1984 | Dalet et al. . | |

FOREIGN PATENT DOCUMENTS

| | | |
|---|---|---|
| 0059142 | 2/1982 | European Pat. Off. . |
| 1336757 | 7/1963 | France . |
| 2658962 | 7/1978 | Germany . |
| 1058495 | 3/1954 | Greece . |
| 2218494 | 11/1989 | United Kingdom . |

OTHER PUBLICATIONS

Johnston, W.A., "Method for Reducing Stagnation Pressure Losses in Segmented Solid Rocket Motors", *Journal of Propulsion and Power*, vol. 8, No. 3, May 1, 1992, pp. 720–721.

*Primary Examiner*—Louis J. Casaregola
*Attorney, Agent, or Firm*—Fisher, Christen & Sabol

[57] ABSTRACT

A solid propellant charge for a propulsion unit (1). The latter includes a casing (2) containing the solid propellant charge (3), in the form of an elongated body having a longitudinal axis (X—X), which charge (3) has, over part of its longitudinal extent, a propellant charge profile (4) of large combustion area and is subdivided, along the longitudinal axis (X—X), into at least two segments abutting one another with their respective mutually confronting faces. The propulsion unit furthermore includes a nozzle (5) and means (6) for igniting said charge. The propellant charge profile (4) of large combustion area is provided in that part of the propellant charge (3) which is intermediate along the longitudinal axis (X—X).

14 Claims, 3 Drawing Sheets

SOLID PROPELLANT CHARGE FOR A PROPULSION UNIT AND PROPULSION UNIT EQUIPPED WITH SUCH A CHARGE

BACKGROUND OF THE INVENTION

1. Field of the Invention

The present invention relates to a solid propellant charge for a propulsion unit and to a propulsion unit equipped with such a charge.

The invention applies more particularly, albeit not exclusively, to a large propulsion unit for a space launcher vehicle.

2. Background Art

Space launching systems fairly often comprise large solid-propellant propulsion units, usually known in space technology as "boosters". These have variable sizes from ten to several hundred tonnes, depending on the launching systems.

In fact, a launcher vehicle requires a high level of thrust during the first part of its trajectory, and solid propulsion is, up to now, the most economical means for meeting this need, provided that there is the necessary knowledge and investment in equipment.

The largest propulsion units are usually produced in pieces (segments), in order to limit the amount of investment necessary. For example, large propulsion units are known which comprise three segments, namely a small segment of 30 tons and two large segments of 100 tons, or four segments, each having a substantially equivalent mass (approximately 125 tons).

It is known, moreover, that the law of thrust of a large propulsion unit involves complex dimensioning aimed at overall optimization of the launcher vehicle, and this always results in a high initial thrust level followed fairly often by a gap for the purpose of avoiding excessive dynamic pressures on the launcher vehicle which bring about a high level of thermal and mechanical loads and stringent steering requirements for controlling it.

Since the combustion of a solid-propellant engine takes place in parallel strata, the only means of conforming to the specification of the law of thrust is to produce a suitable initial charge profile having a large combustion area. In practice, the high level of output required over the first part of the trajectory is obtained by means of a specific cross-sectional profile, for example in the form of a star, which has the property of disappearing after the desired period of time.

In all the large segmented propulsion units, this profile is placed at the front of the engine (the upper part in the operating position). There are two alternative embodiments of said profile, in particular having a star-shaped cross section:

- a specific smaller segment may be made in order to produce this profile more easily on an industrial scale (removal from the mold in a single operation), but this is to the detriment of performance (the presence of unequal segments makes it necessary to manufacture at least one additional segment),
- the profile may require a core which has to be demounted in pieces after casting, and this constitutes a source of increase in the recurring cost.

Large "monobloc" propulsion units are also known, which derive from the latest techniques developed for military propulsion, the profile of these being placed at the rear. However, the largest "monobloc" propulsion unit being developed at the present time does not exceed 60 tonnes.

BROAD DESCRIPTION OF THE INVENTION

The object of the invention is to avoid the abovementioned disadvantages of conventional propulsion units by means of a solid propellant charge designed in an original way.

For this purpose, the solid propellant charge for a propulsion unit, the latter comprising a casing containing said solid propellant charge, in the form of an elongate body having a longitudinal axis, which charge has, over part of its longitudinal extent, a propellant charge profile of large combustion area and is subdivided, along said longitudinal axis, into at least two segments abutting one another with their respective mutually confronting faces, said propulsion unit comprising, furthermore, a nozzle and means for igniting said charge, is notable, according to the invention, in that said propellant charge profile of large combustion area is provided in that part of said propellant charge which is intermediate along said longitudinal axis.

Moving the propellant charge profile of large combustion area from the front toward an intermediate part of the charge makes it possible to obtain a higher propellant filling coefficient, a lower deposit of alumina in the rear bottom and greater progressiveness of the law of thrust, thus bringing about an increase in performance. Moreover, such a profile, provided substantially "in the middle" of the charge, produces a nodal cavity capable of damping the thrust oscillations inherent in any large solid-propellant propulsion unit and, above all, limits the production of a front (antinodal) cavity which tends to amplify said oscillations. Furthermore, it becomes easier to use composite structures which are otherwise complicated by too many diametral connections.

Within the scope of the above definition, the propellant charge profile of large combustion area may advantageously be provided at different locations of the charge.

Thus:

- the propellant charge profile of large combustion area may be provided in the rear part of the front segment of said charge,
- the propellant charge profile of large combustion area may be provided at the front part of the rear segment of said charge, or
- the propellant charge profile of large combustion area may be allocated to the rear part of a front segment and to the front part of a rear segment.

In the latter case, as regards a solid propellant charge having three segments, a central segment may be arranged between said front and rear segments, and said front and rear segments may advantageously be identical, both in the case of a two-segment charge and in the case of a three-segment charge.

Moreover, in the case of a solid propellant charge having three segments, said solid propellant charge profile of large combustion area may be provided at the rear part of the central segment, the front and rear segments of said charge then advantageously being identical.

More specifically, the profile of large combustion area may be provided over at most half and at least one ninth of the total length of the charge, between two prohibited zones for positioning this profile: these prohibited zones extend at the front and rear of the charge over approximately one sixth of the total length of the charge. Furthermore, where a profile of large combustion area is provided on a single segment or at most on two segments of the charge, on each of the segments where it is provided the profile of large combustion area occupies at most half and, preferably, one third of the length of said segment and opens onto only one of the ends of said segment.

As regards a charge comprising two or three segments:

if the profile of large combustion area is provided on the segment at the front of the charge, the profile is at the rear of said front segment, if the profile of large combustion area is provided on the segment at the rear of the charge, the profile is at the front of said rear segment.

As regards a charge comprising three segments, when the profile of large combustion area is provided on the central segment of the charge the profile of large combustion area is at the rear of said central segment.

BRIEF DESCRIPTION OF THE INVENTION

The Figures of the accompanying drawing will make it easy to understand how the invention may be put into practice. In these Figures, identical references designate like elements.

DETAILED DESCRIPTION OF THE INVENTION AND THE DRAWINGS

Figure 1:
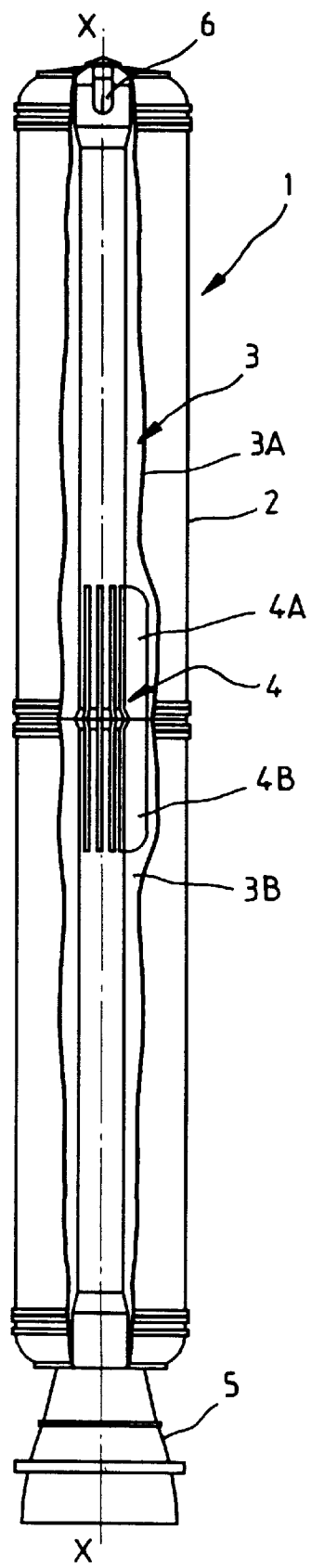
FIG. 1 is a diagrammatic cutaway view of an exemplary embodiment of a large propulsion unit having a solid propellant charge according to the invention.

The propulsion unit 1, shown in FIG. 1, which may, in particular, be a large propulsion unit for a space launcher vehicle, comprises a casing 2 containing a solid propellant charge 3, in the form of an elongate body having a longitudinal axis X—X. The charge 3 has, over part of its longitudinal extent, a propellant charge profile 4 of large combustion area, for the reasons explained above, and, in this example, is subdivided along the longitudinal axis X—X into two segments 3A, 3B abutting one another with their respective mutually confronting faces.

The propulsion unit 1 comprises, furthermore, a nozzle 5 at the rear end of the propulsion unit and means 6 for igniting the charge 3 which are provided at the front end of the propulsion unit. In light of the above definitions of the "front" and "rear" ends of the propulsion unit in relation to the locations of the nozzle 5 and of the ignition means 6, the charge segment nearest to the front end will be designated below as the "front" segment of the charge and the segment nearest to the rear end as the "rear" segment.

More particularly, according to the invention, the propellant charge profile 4 of large combustion area is arranged in that part of the propellant charge 3 which is intermediate along the longitudinal axis X—X.

Figure 4A:
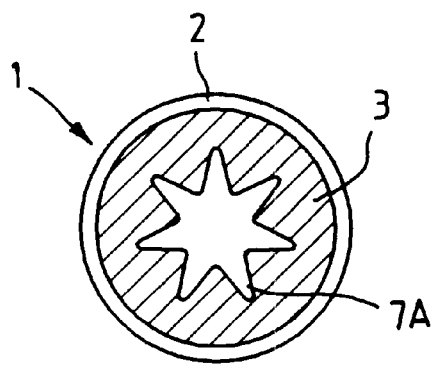
FIGS. 4A–4D are cross sections through a large propulsion unit, showing different propellant charge patterns.
Figure 4B:
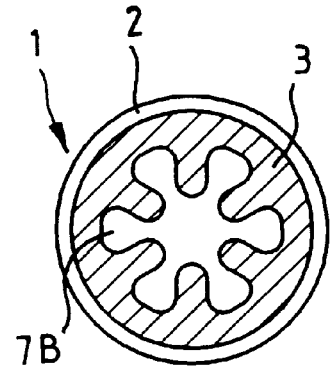
Figure 4C:
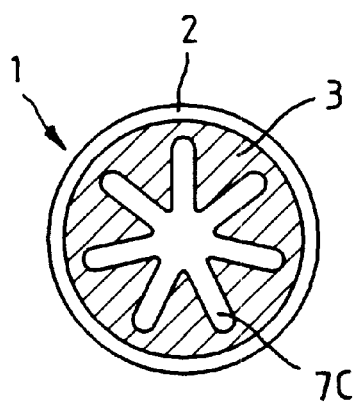
Figure 4D:
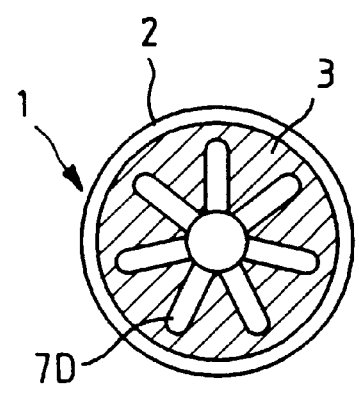

The charge profile 4 may have different cross-sectional patterns, as shown in FIGS. 4A–4D. Of these, FIG. 4A illustrates the star-shaped pattern 7A, FIG. 4B the pattern in the form of a wagonwheel 7B, FIG. 4C the socalled "finocyl" pattern 7C, and FIG. 4D the socalled "trumpet" pattern 7D. These patterns are well known in this technical field and, as such, do not form part of the invention.

Different exemplary embodiments of a solid propellant charge 3 are illustrated, on the one hand, with regard to a two-segment charge 3A, 3B in FIGS. 2A to 2D and, on the other hand, with regard to a three-segment charge 3A, 3B, 3C in FIGS. 3A to 3E.

Figure 2A:
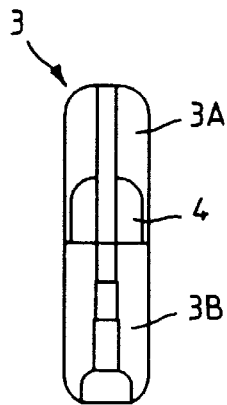
FIGS. 2A–2D illustrate diagrammatically different exemplary embodiments of a solid propellant charge according to the invention which consists of two segments.
Figure 2B:
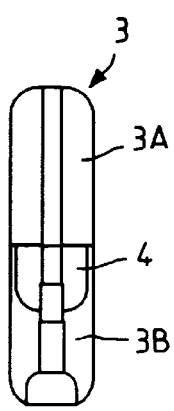
Figure 2C:
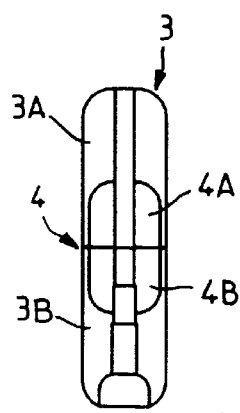
Figure 2D:
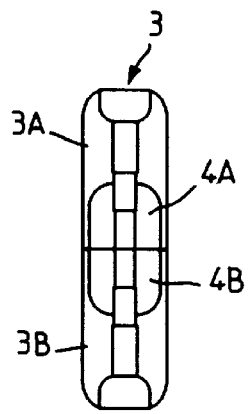

In FIG. 2A, the propellant charge profile 4 of large combustion area is provided at the rear part of the front segment 3A. In FIG. 2B, said profile 4 is provided at the front part of the rear segment 3B. In FIG. 2C (as in FIG. 1), said profile 4 is allocated, at 4A and 4B, to the rear part of the front segment 3A and to the front part of the rear segment 3B. FIG. 2D, similar to FIG. 2C, shows that a solid propellant charge 3 can be produced from two identical segments (but, of course, arranged opposite to one another), thus reducing the manufacturing costs.

Figure 3A:
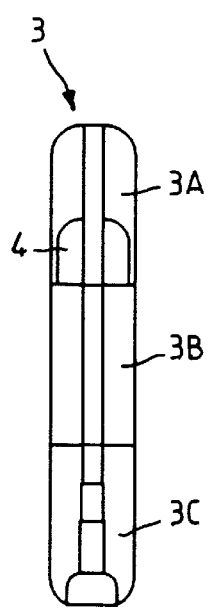
FIGS. 3A–3E show diagrammatically different exemplary embodiments of a solid propellant charge according to the invention which consists of three segments.
Figures 3B, 3C:
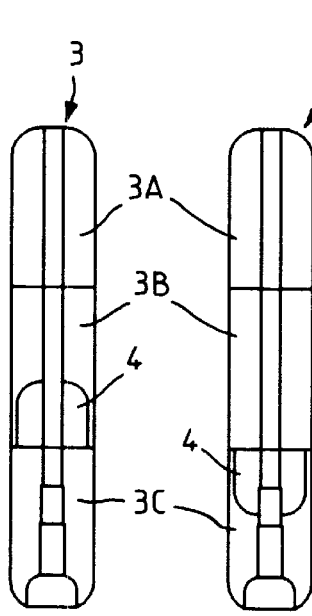
Figure 3D:
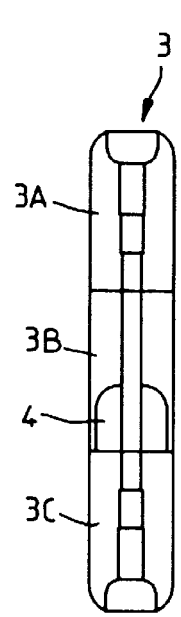
Figure 3E:
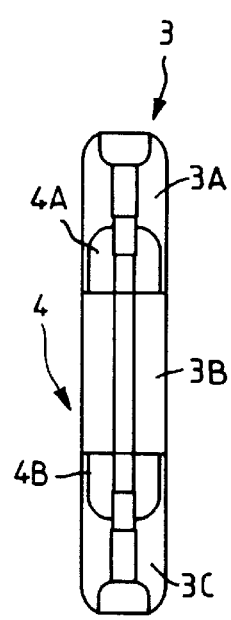

In FIG. 3A, the propellant charge profile 4 of large combustion area is provided at the rear part of the front segment 3A. In FIG. 3B, said profile 4 is provided at the rear part of the central segment 3B. In FIG. 3C, said profile 4 is provided at the front part of the rear segment 3C. FIG. 3D illustrates, in fact, an alternative embodiment of the charge 3 shown in FIG. 3B, in which variant the two front and rear segments 3A and 3C are produced identically in order to reduce the manufacturing costs. Moreover, in FIG. 3E, said profile 4 is allocated at 4A and 4B to the rear part of the front segment 3A and to the front part of the rear segment 3C, with a "conventional" central segment 3B being interposed.

The invention makes it possible to manufacture a minimum of substantially equal segments (if appropriate, even identical), whilst having a core demountable en bloc, thus making it possible to minimize the number of connections, which are a source of useless masses, and to reduce the manufacturing and investment costs and, furthermore, optimize the conditions of use of composite materials if composite structures are liable to be used.

What is claimed is:

1. A solid propellant charge for a propulsion unit comprising a casing containing said solid propellant charge, a nozzle and ignition means for igniting said charge, said solid propellant charge having the form of an elongated body with a longitudinal axis and being subdivided along said longitudinal axis into at least two segments abutting one another with their respective mutually confronting faces, wherein said solid propellant charge has a star-shaped profile cross-section merely in the longitudinally intermediate part of said charge.

2. The solid propellant charge as claimed in claim 1, wherein said propellant charge of star-shaped cross-section is provided at the rear part of the front segment of said charge.

3. The solid propellant charge as claimed in claim 1, wherein said propellant charge of star-shaped profile cross-section is provided at the front part of the rear segment of said charge.

4. The solid propellant charge as claimed in claim 1, wherein said propellant charge of star-shaped profile cross-section is allocated to the rear part of a front segment and to the front part of a rear segment.

5. The solid propellant charge as claimed in claim 4, wherein, in the case of a solid propellant charge having three segments, a central segment is arranged between said front and rear segments.

6. The solid propellant charge as claimed in claim 4, wherein said front and rear segments are identical.

7. The solid propellant charge as claimed in claim 1, wherein, in the case of a solid propellant charge having three segments, said solid propellant charge profile is provided at the rear part of the central segment.

8. The solid propellant charge as claimed in claim 7, wherein the front and rear segments of said charge are identical.

9. The solid propellant charge as claimed in claim 1, wherein said solid propellant charge profile is provided over at most half and at least one ninth of the total length of the charge, between two prohibited zones for positioning said profile, these prohibited zones extending at the front and rear of the charge over approximately one sixth of the total length of the charge.

10. The solid propellant charge as claimed in claim 1, wherein said solid propellant charge profile is provided on a single segment or at most on two segments of the charge, on each of the segments where it is provided said profile occupies at most half and, preferably, one third of the length of said segment and opens onto only one of the ends of said segment.

11. The solid propellant charge as claimed in claim 1, wherein, as regards a charge comprising two or three segments:

if said solid propellant charge profile is provided on the segment at the front of the charge, said profile is at the rear of said front segment, if said solid propellant charge profile is provided on the segment at the rear of the charge, said profile is at the front of said rear segment.

12. The solid propellant charge as claimed in claim 1, wherein, as regards a charge comprising three segments, when said solid propellant charge profile is provided on the central segment of the charge, said profile is at the rear of said central segment.

13. A propulsion unit, of the type comprising a casing containing a longitudinally segmented solid propellant charge having a solid propellant charge of star-shaped profile cross-section over part of its longitudinal extent, a nozzle and ignition means, wherein said solid propellant charge is as defined according to claim 1.

14. The propulsion unit as claimed in claim 13, wherein said propulsion unit is a large propulsion unit for a space launcher vehicle.

* * * * *